UNITED STATES PATENT OFFICE.

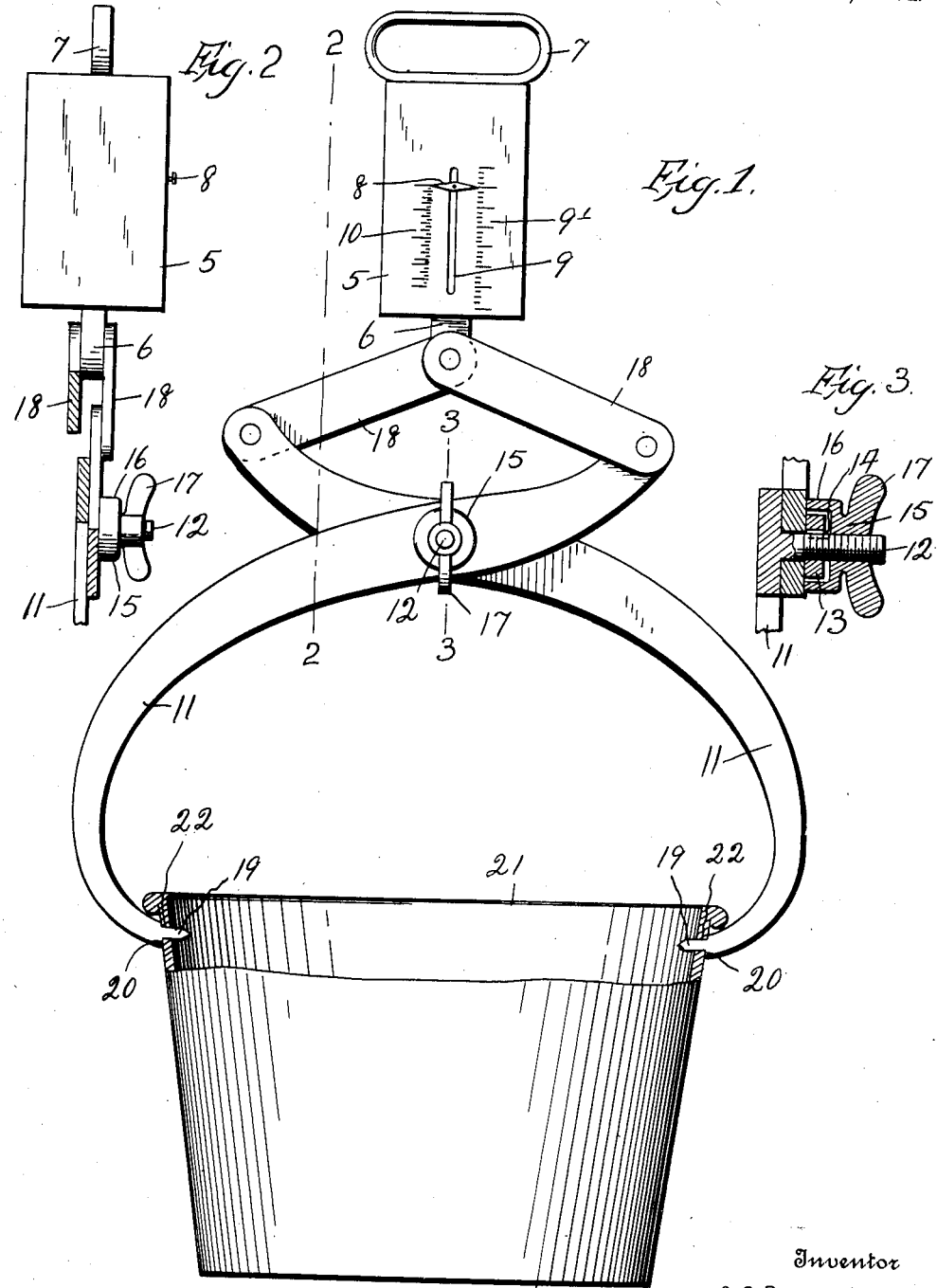

OLIVER C. RITZ-WOLLER, OF JACKSONVILLE, FLORIDA.

WEIGHING-TONGS.

1,084,663.  Specification of Letters Patent.  Patented Jan. 20, 1914.

Application filed February 27, 1913. Serial No. 751,129.

*To all whom it may concern:*

Be it known that I, OLIVER C. RITZ-WOLLER, citizen of the United States, residing at Jacksonville, in the county of Duval and State of Florida, have invented certain new and useful Improvements in Weighing-Tongs, of which the following is a specification, reference being had to the accompanying drawings.

This invention relates to an improved weighing tongs and has for its primary object to provide a simple, durable and efficient device of the above character whereby a number of articles placed in a pail or other receptacle may be accurately weighed.

Another object of the invention resides in the provision of an improved weighing tongs including a suitable weighing scale and cross pivotally connected tong members connected by links to the scale beam, and means for locking the tong members against relative movement after the same have gripped the object to be weighed.

A further object of the invention is to provide a device of the above character which may be utilized for weighing ice, groceries and similar commodities, and which may be manufactured at small cost and is highly serviceable and convenient in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a weighing tongs embodying the present invention showing the tong members engaged with a pail or other receptacle, a portion of the pail being shown in section. Fig. 2 is a section taken on the line 2—2 of Fig. 1; and Fig. 3 is an enlarged detail section taken on the line 3—3 of Fig. 1.

Referring in detail to the drawing, 5 designates the casing of the scale which may be of any desired polygonal form and constructed of sheet metal or other material. The scale beam 6 extends longitudinally through this casing and projects beyond the opposite ends thereof. This scale beam is controlled by means of a coil spring arranged within the casing 5 in the usual manner. As the construction of this scale involves no part of the present invention, the same will not therefore be described in detail. The upper end of the scale beam 6 is provided with the usual hand loop 7, and this beam carries a pointer or indicator 8 which projects through a vertical slot 9 formed in the wall of the casing 5. Contiguous to the opposite edges of this slot, the graduated scales 9' and 10 are provided. The scale 9' is used when ice is being weighed while the scale 10 is employed for weighing groceries, the latter scale being provided with relatively fine graduations.

The tong members indicated at 11 are crossed adjacent to one of their ends and pivotally connected by means of the stud bolt 12 which may be integrally formed with one of said members. The other of the members is provided with an opening through which said bolt is loosely disposed. Upon the threaded portion of this bolt, the nut 13 is adapted to be engaged, and said nut as well as the bolt 12 is provided with suitable key-ways to receive a key 14 whereby the nut may be held against turning movement. Upon the bolt 12, a clamping nut 15 is threaded, said nut being provided with a hollow body 16 to receive the holding nut 13, oppositely extending wings or finger pieces 17 being formed upon said body whereby the clamping nut may be readily turned upon the bolt. The particular purpose of this connection between the tong members will be more fully set forth in the following description.

The ends of the members 11 adjacent to the pivot bolt 12 upon which the same are mounted are connected by means of the links 18 to the lower end of the scale beam 6. The opposite ends of the tong members are curved in the usual manner and have their extremities reduced as indicated at 19 to form the shoulders 20. These reduced ends of the tong members are in the form of spurs and are adapted to bite into and securely grip a block of ice or other object to be suspended between said members.

21 indicates a pail or other receptacle which is provided adjacent to its upper edge and at diametrically opposite points with the rectangular openings 22. Through these openings, the reduced or spurred ends 19 of the tong members are adapted to be engaged. The shoulders 20 engaging the outer surface of the pail wall limit the inward movement of the tong members therethrough.

In the use of the invention, the pivotally connected members are spread apart and the points or spurs 19 thereof engaged with a block of ice, or through the openings 22 in the pail wall. The operator then pulls upwardly upon the hand loop 7, thereby tending to move the spurred ends of the tong members inwardly to securely retain the ice block or the pail between the same. The clamping nut 15 is now threaded inwardly upon the end of the pivot bolt 12 so that the body portion thereof will tighten against one of the tong members 11 and securely clamp said members together, thus preventing their relative movement and retaining the spurred ends thereof in gripping engagement with the object to be weighed. The operator now lifts the tongs and the object held thereby so that said object is suspended between the tong members out of contact with the floor, table or other support. By now reading the scales 9 or 10, as the case may be, with reference to the position of the indicator or pointer, the weight of the object held between the tong members may be accurately ascertained. By providing my improved clamping means for the tong members, all liability of their accidental separation which would release the ice block or pail held between the same is obviated. This clamping device for the tong members also holds the same against movement with respect to the scale beam after the pail 21 has been gripped between the points of said members, thereby obviating inward pressure of the tong members against the walls of the pail which would crush the upper edge thereof. Thus the pressure of said members against the walls of the pail diametrically thereof is overcome and liability of injury thereto entirely obviated.

From the foregoing, it is believed that the construction and manner of use of my improved weighing tongs will be clearly and fully understood. The invention is simple and durable in its construction, may be manufactured at comparatively small cost and is highly efficient and reliable in actual use. It will of course be obvious, that while I have hereinbefore referred to the preferred form and construction of the several elements employed, the invention is nevertheless susceptible of considerable modification therein and I reserve the right to resort to such modifications as may fairly fall within the spirit and scope of the appended claims.

Having thus described the invention, what is claimed is:

1. The combination with a scale including a vertically movable beam, of tong members crossed adjacent to one of their ends, links connecting said ends of the tong members with the lower end of the scale beam, the other ends of said tong members being reduced and terminating in spurs for engagement through openings provided in the wall of the pail or other receptacle, a pivot bolt integrally formed with one of the tong members and disposed through an opening in the other of said members at the point of intersection of the members, a nut threaded upon said bolt to hold the latter member against longitudinal movement thereon, and a clamping nut threaded upon said bolt to clamp said members together and hold the same against spreading movement.

2. The combination with a scale including a vertically movable beam, of tong members terminating in reduced spurs for engagement with the object to be weighed, a pivot bolt secured to one of said members and loosely disposed through an opening in the other member, a nut threaded upon said bolt to hold the latter member against longitudinal movement thereon, and a clamping nut having a hollow body portion to receive said first named nut and adapted to be threaded inwardly upon the bolt to clamp said tong members together against spreading movement.

In testimony whereof I hereunto affix my signature in the presence of two witnesses.

OLIVER C. RITZ-WOLLER.

Witnesses:
M. C. LYDDANE,
E. L. WHITE.